(12) United States Patent
Johnson et al.

(10) Patent No.: US 6,357,300 B1
(45) Date of Patent: *Mar. 19, 2002

(54) PRESET FLUID DISPENSING METER

(75) Inventors: Harold D. Johnson, Buffalo; Steven P. Plager, Burnsville, both of MN (US)

(73) Assignee: Graco Minnesota Inc., Minneapolis, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,271

(22) Filed: Jan. 31, 1997

Related U.S. Application Data

(60) Provisional application No. 60/010,949, filed on Feb. 1, 1996.

(51) Int. Cl.[7] .............................. G01F 1/00; B67D 5/30
(52) U.S. Cl. .............................. 73/861; 222/14; 222/20
(58) Field of Search ........................... 222/14, 16, 20, 222/33, 52, 59, 71; 73/861

(56) References Cited

U.S. PATENT DOCUMENTS

| | | | | |
|---|---|---|---|---|
| 1,754,589 A | * | 4/1930 | Wydler | 222/52 X |
| 1,929,719 A | * | 10/1933 | Werder | 222/59 X |
| 3,206,071 A | * | 9/1965 | Boudot et al. | 222/20 |
| 3,638,689 A | * | 2/1972 | Eklund | 141/214 |
| 3,805,997 A | * | 4/1974 | Csabafy et al. | 222/20 |
| 4,004,715 A | * | 1/1977 | Williams et al. | 222/30 |
| 4,057,173 A | * | 11/1977 | Tal | 222/59 X |
| 4,083,497 A | * | 4/1978 | Rosenberger | 239/526 |
| 4,244,403 A | * | 1/1981 | Legleiter | 222/52 X |
| 4,503,994 A | * | 3/1985 | Pyle | 222/52 X |
| 4,572,255 A | * | 2/1986 | Rabinovich | 222/14 X |
| 4,795,060 A | * | 1/1989 | Albrecht | 222/59 X |
| 4,883,199 A | * | 11/1989 | Ouarve et al. | 222/14 |
| 5,184,309 A | * | 2/1993 | Simpson et al. | 364/510 |
| 5,363,989 A | * | 11/1994 | Zeamer et al. | 222/16 |
| 5,527,451 A | * | 6/1996 | Hembree et al. | 222/14 X |
| 5,803,313 A | * | 9/1998 | Flatt et al. | 222/146.5 |
| 5,974,611 A | * | 11/1999 | Casella | 15/3.52 |

* cited by examiner

*Primary Examiner*—Harshad Patel
(74) *Attorney, Agent, or Firm*—Douglas B. Farrow

(57) ABSTRACT

A preset fluid dispensing meter is provided with a trigger which pivots on the shaft operating the valve and which is capable of operating: (a) in a manual dispense mode; (b) in a mode where it may be latched on until unlatched manually; or (c) which may be set to dispense a predetermined amount of fluid before termination of dispensing. A solenoid operates a catch which rocks away from the trigger thereby allowing the spring loaded valve stem to close once the trigger is no longer restrained.

3 Claims, 4 Drawing Sheets

PRESET FLUID DISPENSING METER

This application claims benefit to Provisional Application No. 60/010,949 filed Feb. 1, 1996.

BACKGROUND OF THE INVENTION

In the lubrication and other industries, preset meters for dispensing a preset amount of fluid are desirable for a number of reasons. First of all, such meters insure that only the exact amount of a fluid is dispensed in an application, for instance exactly four quarts of engine oil are dispensed into an automobile engine. Secondly, use of the preset meter allows the operator to work on other items while the fluid is dispensing thereby enhancing productivity.

Such preset meters in general have been known and used for many years and for a long time were strictly mechanical. More recently, electronic meters come into vogue. It is desired to have a meter which is accurate yet which provides long battery life so that the unit does not need to be serviced too often.

SUMMARY OF THE INVENTION

It is therefore an object of the invention to provide a preset meter which provides long battery life and yet which is capable of dispensing amounts of fluid accurately and furthermore which is easily operated in a variety of modes by the person utilizing the device.

The meter is provided with a dispensing valve having a stem which is slightly biased to the off position. Pressing down the stem opens the valve and allows fluid to dispense while removal of pressure on the stem again allows the valve to close. A trigger which is at least as wide as two fingers is mounted on the valve stem and allowed to pivot in the range of about 5° between a latch position where it can be engaged by a latch and a manual position where the latch does not engage it.

A latching type solenoid is operated responsive to the electronic fluid meter and the shaft is normally held in position by a magnet, the filed is which is overcome when the coil of the solenoid is energized. The meter may be of any conventional type which outputs a short electrical pulse to the solenoid which in turn operates a lever arm mounted on the shaft and a catch which can engage one end of the trigger. In normal use, the solenoid is non-energized and normally the catch member is located in a first position capable of engaging the trigger. Only for the brief period of time, when signaled by the meter that the predetermined amount has been reached, is the solenoid activated to free the catch member from the trigger.

Pulling on the trigger allows manual dispensing and rocking it in one direction allows the trigger first end to engage the catch member and rocking in the other end prevents latching so that the dispense operation may be a pure manual spring loaded operation.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

DESCRIPTION OF THE PREFERRED EMBODIMENT

Figure 1:
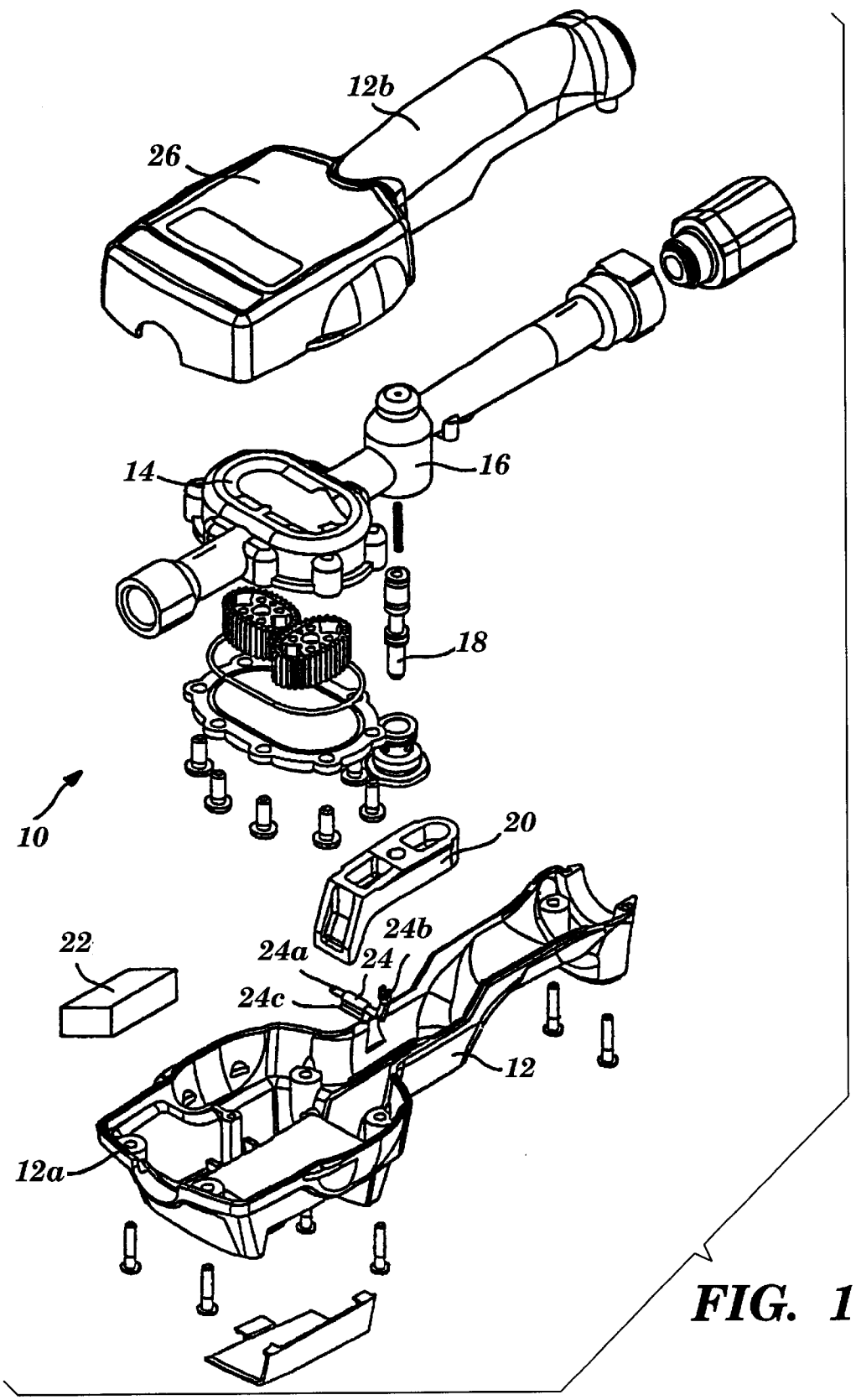
FIG. 1 is an exploded perspective view of the device of the instant invention.

The instant invention, generally designated 10, is comprised of a body 12 having lower and upper halves 12a and 12b respectively. Located therein is a meter 14 as shown and having located at the inlet thereof a valve 16 which is close to balanced by slightly biased to the closed position and which is operated by a valve stem 18. Valve stem 18 is operated by trigger 20 which sits in the lower half 12a of housing 12.

Figure 2:
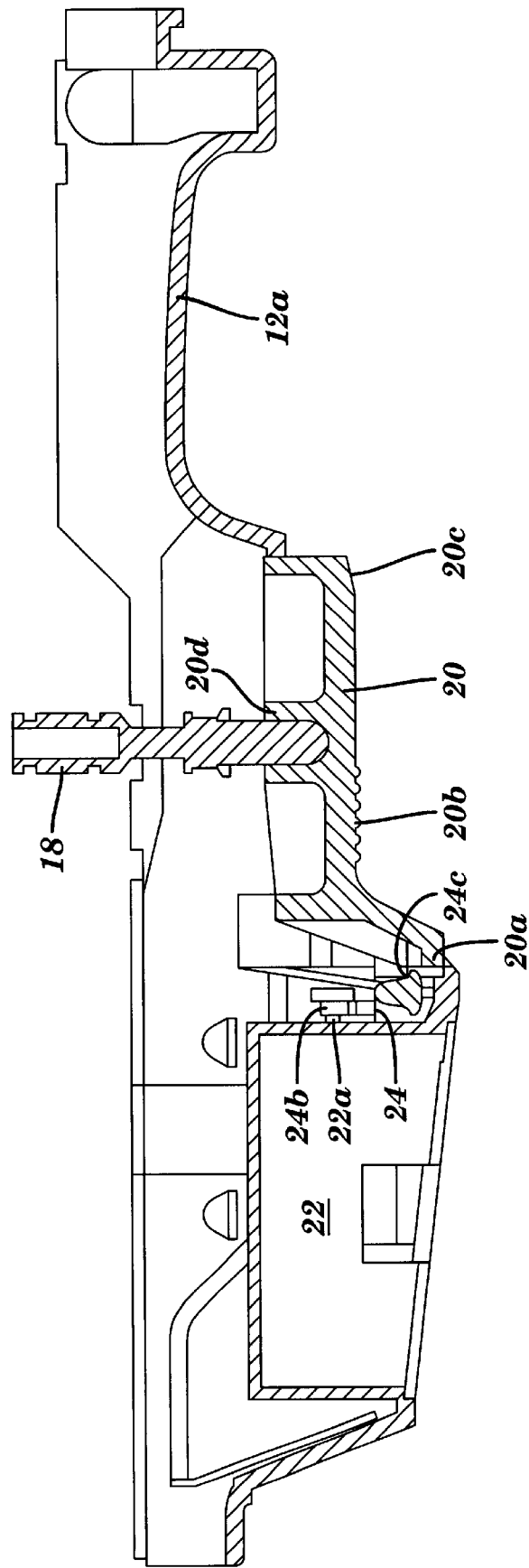
FIG. 2 is a sectional view showing the dispensing device in the unlocked position with the valve closed.

Turning to FIG. 2, solenoid 22 has an operating pin 22a which bears against catch member 24. Catch member 24 rotates about shaft 24a relative to housing 12 and is operated by a lever arm 24b thereon. Catch engaging member 24c may engage the first end 20a of trigger 20. Trigger 20 has locking operating portion 20b and unlocking operating portion 20c. An aperture 20d in trigger 20 located between first and second trigger ends 20A and 20C respectively is formed with an angle such that trigger 20 may pivot approximately 5° in the preferred embodiment relative to valve stem 18 thereby allowing the operation which will be set forth in more detail hereinafter.

In order to operate the device as a manual dispensing valve, the operator pulls upwardly on the unlocking portion 20c of trigger 20 thereby keeping trigger 20 rotated generally in its most counterclockwise portion such that catching first end 20a of trigger 20 is clear of catch member 24 and its engaging edge 24c. The operator then merely pulls upwardly on trigger 20 until the desired amount has been dispensed whereupon the operator releases trigger 20 and spring loaded valve 16 closes and dispensing halts.

Figure 3:
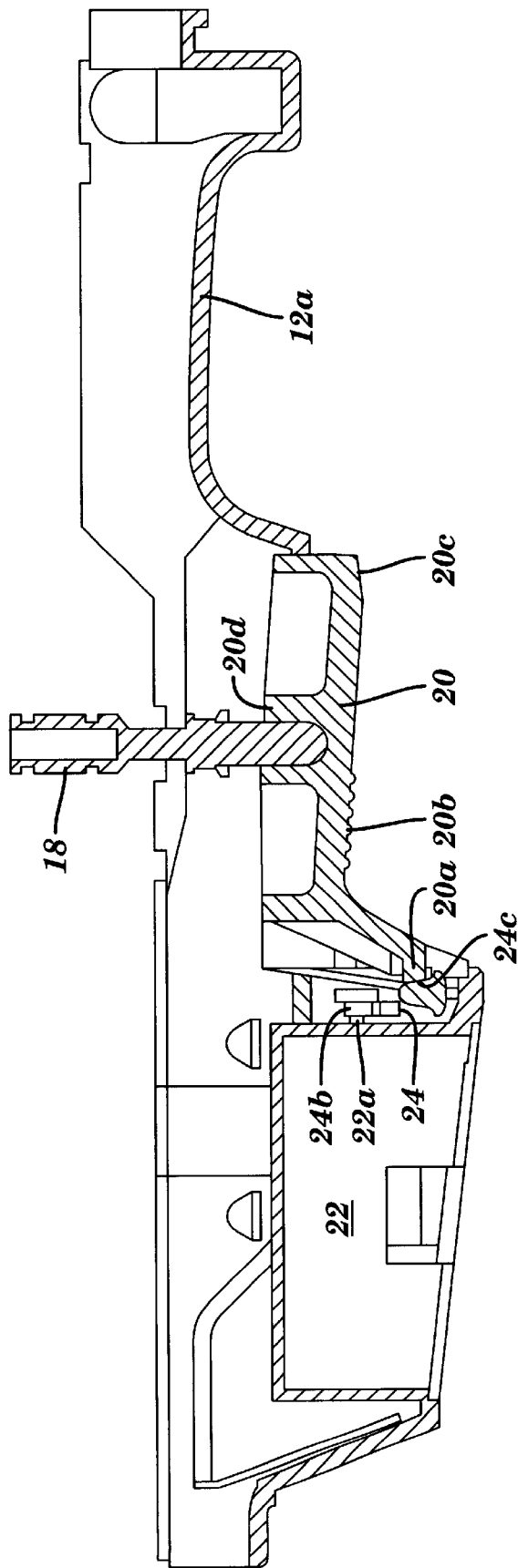
FIG. 3 is a sectional view similar to that of FIG. 2 only showing the trigger in the locked position with the valve open and fluid flowing.

To operate in a manual latching mode, the operator need merely pull upwardly on latching portion 20b of trigger 20 wherein trigger 20 rotates to the position shown in FIG. 3 and trigger end 20a engages catch edge 24c. When the desired amount of fluid has been dispensed, the operator need merely pull on the unlatching end 20c of trigger 20 to disengage the catch.

Figure 4:
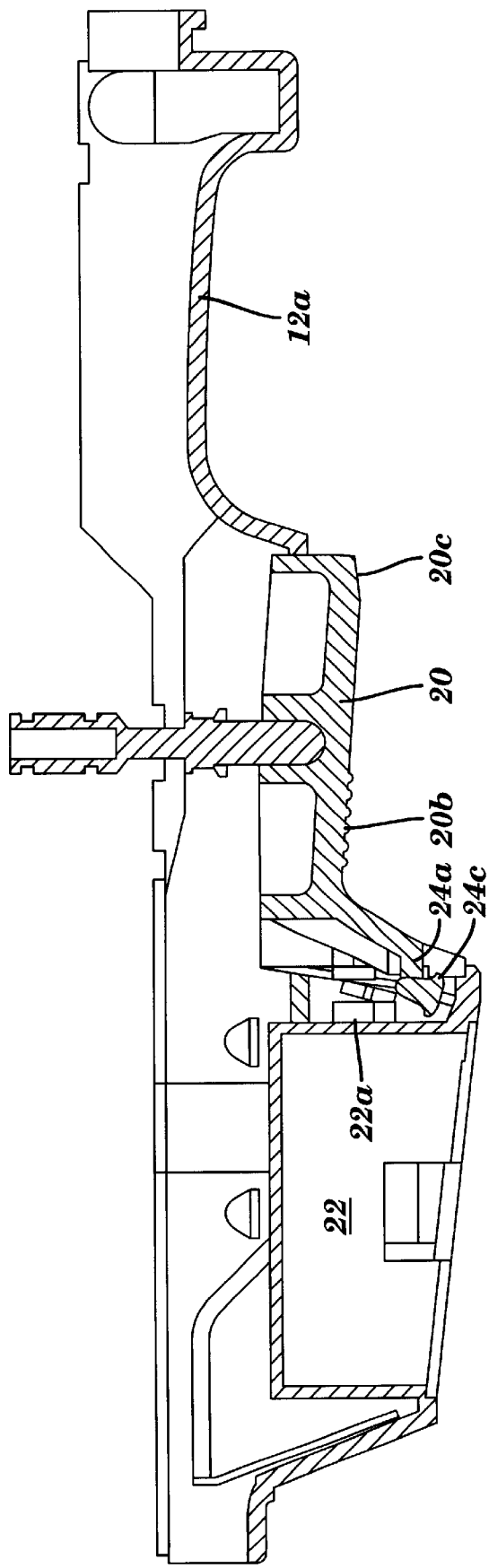
FIG. 4 is a sectional view similar to FIGS. 2 and 3 showing the trigger being unlatched.

To automatically dispense a predetermined amount, the appropriate amount is entered through keyboard 26 and the trigger 20 locked in the on position as discussed in the preceding paragraph. When the predetermined amount has been dispensed, solenoid 22 is actuated by meter 14 with pin 22a pushing arm 24a of catch 24 into the position shown in FIG. 4 thereby causing shaft 24b to rotate and engaging edge 24c to disengage from trigger 20. The solenoid need only be energized for a short time e.g. 160 microseconds or in any case less than one second.

It is contemplated that various changes and modifications may be made to the meter without departing from the spirit and scope of the invention as defined by the following claims.

What is claimed is:

1. A meter for dispensing fluids, said meter comprising:
   a body;
   a balanced valve for controlling the flow of fluid, said valve comprising a valve stem movable between an open position allowing fluid flow and a closed position preventing fluid flow and being biased toward said closed position;

a trigger located in said body, said trigger comprising a length and first and second ends and pivotable on said valve stem intermediate said first and second ends;

means for measuring the amount of fluid which has flowed through said meter;

a catch member movable between first and second positions wherein said catch member may engage said trigger first end when catch member is in said first position and wherein said catch member does not engage said trigger first end when in said second position; and means responsive to said measuring means for moving said catch member from said first position to said second position when a predetermined amount of fluid has been measured and to allow manual unlatching.

2. The fluid dispensing meter of claim 1 wherein said catch member is biased toward said first position.

3. The fluid dispensing meter of claim 1 wherein said trigger pivots to move between a latch position capable of engaging said catch member and a manual position wherein said trigger cannot engage said catch member.

* * * * *